US012725785B2

(12) United States Patent
Ren et al.

(10) Patent No.: US 12,725,785 B2
(45) Date of Patent: Sep. 1, 2026

(54) MODIFIED SILICON-CARBON NEGATIVE ELECTRODE MATERIAL, PREPARATION METHOD THEREFOR, AND APPLICATION THEREOF

(71) Applicant: HENGDIAN GROUP DMEGC MAGNETICS CO., LTD, Jinhua (CN)

(72) Inventors: Hailiang Ren, Jinhua (CN); Guoguang Wang, Jinhua (CN); Yiyao Han, Jinhua (CN); Yang Xia, Jinhua (CN); Jun Xu, Jinhua (CN)

(73) Assignee: HENGDIAN GROUP DMEGC MAGNETICS CO., LTD, Jinhua (CN)

( * ) Notice: Subject to any disclaimer, the term of this patent is extended or adjusted under 35 U.S.C. 154(b) by 465 days.

(21) Appl. No.: 18/258,970

(22) PCT Filed: Apr. 25, 2021

(86) PCT No.: PCT/CN2021/089658
§ 371 (c)(1),
(2) Date: Jun. 22, 2023

(87) PCT Pub. No.: WO2022/134414
PCT Pub. Date: Jun. 30, 2022

(65) Prior Publication Data

US 2024/0047649 A1 Feb. 8, 2024

(30) Foreign Application Priority Data

Dec. 23, 2020 (CN) ......................... 202011538533.7

(51) Int. Cl.
*H01B 1/04* (2006.01)
*C01B 33/02* (2006.01)
(Continued)

(52) U.S. Cl.
CPC ............. *H01M 4/364* (2013.01); *C01B 33/02* (2013.01); *H01B 1/04* (2013.01); *H01M 4/386* (2013.01);
(Continued)

(58) Field of Classification Search
CPC .. H01B 1/00; H01B 1/04; H01M 4/38; H01M 4/40; H01M 4/62; H01M 10/0525
See application file for complete search history.

(56) References Cited

U.S. PATENT DOCUMENTS 6,652,605 B1 * 11/2003 Bourbon ................ C01G 31/00 429/231.95
7,682,595 B2 * 3/2010 Inoue .................... H01M 4/525 423/594.6
(Continued)

FOREIGN PATENT DOCUMENTS

CN 103943825 A 7/2014
CN 103943826 A 7/2014
(Continued)

OTHER PUBLICATIONS

KR-102006173-B1 (pub Aug. 1, 2019) English language machine translation.*
(Continued)

*Primary Examiner* — Mark Kopec
(74) *Attorney, Agent, or Firm* — Andrus Intellectual Property Law, LLP

(57) ABSTRACT

A modified silicon-carbon negative electrode material, a preparation method therefor, and an application thereof are disclosed. A method includes mixing a silicon-carbon negative electrode material with a lithium alkoxide solution to carry out a solvothermal reaction. The solid powder obtained after the solvothermal reaction is alcohol washed. The powder is dried to obtain the modified silicon-carbon nega-
(Continued)

tive electrode material. The lithium alkoxide solution is formed by mixing metallic lithium with an alcohol solvent.

11 Claims, 1 Drawing Sheet

(51) Int. Cl.

| | |
|---|---|
| ***H01M 4/36*** | (2006.01) |
| ***H01M 4/38*** | (2006.01) |
| ***H01M 4/587*** | (2010.01) |

(52) U.S. Cl.

CPC ......... *H01M 4/587* (2013.01); *C01P 2004/61* (2013.01); *C01P 2004/80* (2013.01); *C01P 2006/40* (2013.01)

(56) References Cited

U.S. PATENT DOCUMENTS

| | | | |
|---|---|---|---|
| 2019/0088922 | A1 | 3/2019 | Zhamu et al. |
| 2020/0194785 | A1 | 6/2020 | Jung |

FOREIGN PATENT DOCUMENTS

| | | | | |
|---|---|---|---|---|
| CN | 106816594 | A | | 6/2017 |
| CN | 109326788 | | * | 2/2019 |
| CN | 109411717 | A | | 3/2019 |
| CN | 109713227 | A | | 5/2019 |
| CN | 110010863 | A | | 7/2019 |
| CN | 110429265 | A | | 11/2019 |
| CN | 110556509 | A | | 12/2019 |
| CN | 110679019 | A | | 1/2020 |
| CN | 110890538 | A | | 3/2020 |
| CN | 111384443 | A | | 7/2020 |
| CN | 111584853 | | * | 8/2020 |
| CN | 111584853 | A | | 8/2020 |
| CN | 112652757 | A | | 4/2021 |
| CN | 112701267 | A | * | 4/2021 |
| JP | 2012204306 | A | | 10/2012 |
| JP | 2012209195 | A | | 10/2012 |
| JP | 2016066579 | A | | 4/2016 |
| JP | 2016154122 | A | | 8/2016 |
| JP | 2016207446 | A | | 12/2016 |
| JP | 2018101622 | A | | 6/2018 |
| JP | 2019204684 | A | | 11/2019 |
| JP | 2020061348 | A | | 4/2020 |
| JP | 2020113495 | A | | 7/2020 |
| WO | WO 2015125784 | A1 | * | 8/2015 |

OTHER PUBLICATIONS

Office Action for Korean Patent Application No. 10-2021-7037376, dated May 23, 2024.

Extended European Search Report for European Patent Application No. 21908425.8, dated Nov. 5, 2024.

Wiers, Brian M., et al., "A Solid Lithium Electrolyte Via Addition of Lithium Isopropoxide to a Metal-Organic Framework With Open Metal Sites," J. Am. Chem. Soc. 2011, 133, 37, 14522-14525.

Office Action for Japanese Patent Application No. 2023-538076, dated Aug. 22, 2024.

International Search Report for International Patent Application No. PCT/CN2021/089658, mailed Sep. 9, 2021.

First Office Action for CN Patent Application No. 202011538533.7, issued Sep. 3, 2021.

Nie, Ping et al., "Prelithiation Technologies and Application in High Energy Silicon Anodes," Energy Storage Science and Technology, vol. 6, No. 5, Sep. 2017.

Jang, Juyoung et al., "Molecularly Tailored Lithium-Arene Complex Enables Chemical Prelithiation of High-Capacity Lithium-Ion Battery Anodes," Angew. Chem. Int. Ed. 10.1002/anie.202002411, (pub year 2020).

* cited by examiner

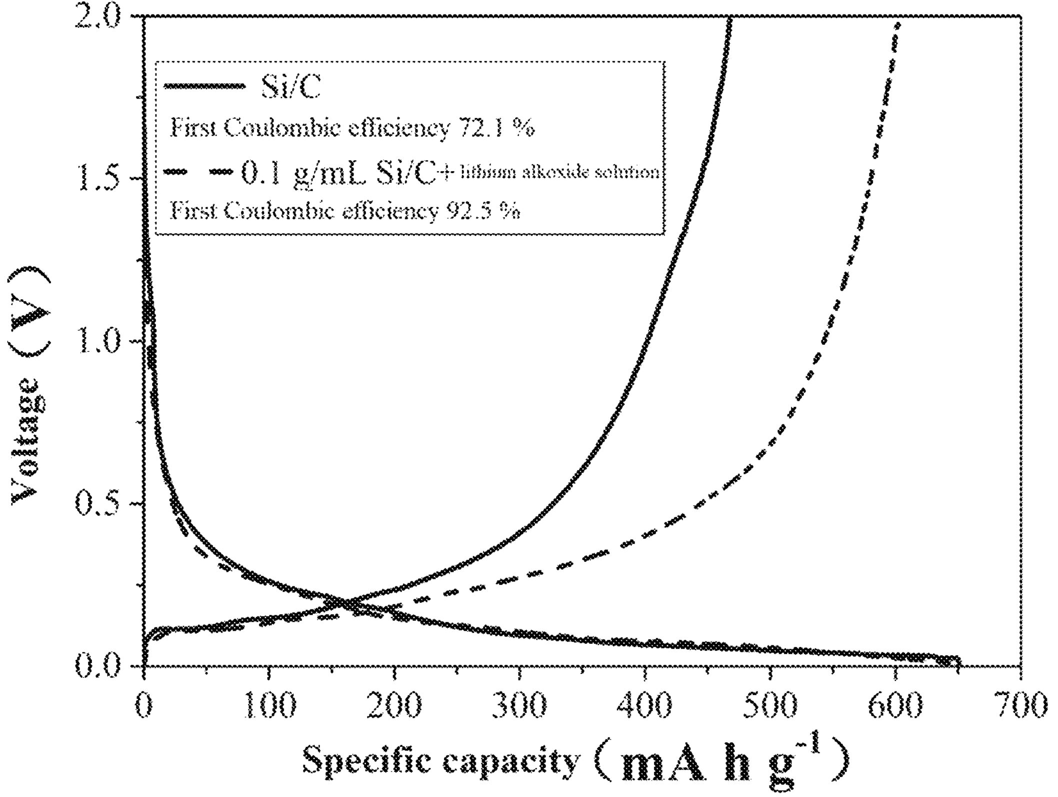
Si/C
First Coulombic efficiency 72.1 %
0.1 g/mL Si/C+ lithium alkoxide solution
First Coulombic efficiency 92.5 %
2.0
1.5
1.0
0.5
0.0
Voltage (V)
0
100
200
300
400
500
600
700
Specific capacity (mA h g-1)

MODIFIED SILICON-CARBON NEGATIVE ELECTRODE MATERIAL, PREPARATION METHOD THEREFOR, AND APPLICATION THEREOF

CROSS-REFERENCE TO RELATED APPLICATIONS

This is a national stage application filed under 37 U.S.C. 371 based on International Patent Application No. PCT/CN2021/089658, filed Apr. 25, 2021, which claims priority to Chinese Patent Application No. 202011538533.7, filed on Dec. 23, 2020, the disclosures of which are incorporated herein by reference in their entireties.

TECHNICAL FIELD

The present application belongs to the technical field of battery and relates to a negative electrode material, for example, to a modified silicon-carbon negative electrode material, a preparation method therefor, and an application thereof.

BACKGROUND

Lithium-ion batteries are widely used in daily life because of their high energy density, long cycle life and low cost. However, the traditional graphite negative electrode can no longer meet the development requirements of the new energy field due to its low specific capacity, so it is important to develop negative electrode materials with high specific capacity.

At present, the most widely used negative electrode material for lithium batteries is graphite, but its theoretical capacity is low at 372 mAh/g, which is difficult to meet the demand of high energy density. Silicon-based negative electrode materials are considered as one of the most promising negative electrode materials for lithium batteries due to their theoretical capacity being more than ten times that of commercial graphite negative electrodes, low discharge potential, and abundant reserves. However, in the process of lithium-ion intercalation, silicon is accompanied by a severe volume expansion effect, which causes the active material to be pulverized, and further loses contact with the current collector and the conducting agent, resulting in the decrease of the Coulombic efficiency of the battery, the deterioration of the cycle performance and the rapid attenuation of the capacity.

For the volume effect of silicon in the process of intercalation and deintercalation in silicon-carbon negative electrode materials (Si/C negative electrode materials), the first Coulombic efficiency is low, the first irreversible capacity is large, and the high-power charge and discharge performance and cycle life still need to be improved. At the same time, as lithium-ion intercalate and deintercalate from graphite anode, it will cause about 10% expansion and contraction of graphite unit cell volume, so graphite as a matrix also has the problems of low initial charge and discharge efficiency and poor cycle stability.

CN 110890538A discloses a method for improving a first Coulombic efficiency of a silicon-based lithium-ion battery negative electrode material, comprising: (1) determining a hydroxyl content on the surface of the silicon negative electrode material; and (2) grafting a silane coupling agent on the surface of the silicon negative electrode material through organic chemical modification. The method improves the first Coulombic efficiency of silicon negative electrode by determining the hydroxyl content on the surface of the silicon negative electrode and using silane coupling agent containing an inert group with specific content to react with the hydroxyl on the surface of the silicon positive electrode to replace the hydroxyl on the surface of the silicon negative electrode. However, this method has complex operation, and low commercial feasibility.

CN 110429265A discloses a MEG/Si/C composite negative electrode material for lithium-ion batteries and preparation method thereof, the composite negative electrode material includes the following mass fraction components: 2-20% nano-silica powder, 1-3% surfactant and 10-30% carbon source, and the balance of micro-expanded graphite. The expanded graphite is prepared by a chemical oxidation intercalation method and a low-temperature thermal expansion technology, and then the expanded graphite/silicon/carbon composite negative electrode material for lithium-ion batteries is prepared by a mechanical ball milling method and a high-temperature carbonization method. However, this preparation method has large implementation difficulty, poor controllability, complex operation, high cost and low commercial feasibility.

CN 109411717A discloses a pre-lithiated negative electrode material with high reversible capacity and preparation method thereof, the negative electrode material includes graphite carbon material, metal oxide or silicon uniformly distributed thereon, and lithium carbonate. The preparation method includes stirring and mixing the metal oxide or silicon powder, lithium carbonate powder, graphite carbon powder and grinding aid and ball milling. The negative electrode material by adding lithium carbonate reduces the irreversible capacity of the first charge and discharge process of the negative electrode material and improves the first Coulombic efficiency; by adding graphite carbon material, the material improves the structural stability during the reaction and the electrical conductivity of the electrode material. However, this method has many difficulties in actual implementation due to its high cost, complex process and certain risk.

Therefore, there is a need to provide a simple, easy and efficient method to improve the initial Coulombic efficiency of silicon-carbon negative electrode materials.

SUMMARY

An object of the present application is to provide a modified silicon-carbon negative electrode material, a preparation method therefor, and an application thereof. The preparation method has a simple process, and the pre-lithiation of the surface of the silicon-carbon negative electrode material can be realized through a simple solvothermal reaction, so that the irreversible capacity of the first charge and discharge process is reduced, and the first Coulombic efficiency is increased to more than 92%.

To achieve the object, the present application adopts the technical solutions described below.

The present application provides a preparation method of a modified silicon-carbon negative electrode material, which includes the following steps:

(1) mixing a silicon-carbon negative electrode material with a lithium alkoxide solution, and performing a solvothermal reaction;

(2) alcohol-washing solid powder obtained from the solvothermal reaction in step (1), and drying to obtain the modified silicon-carbon negative electrode material;

the lithium alkoxide solution is prepared by mixing metal lithium with an alcohol solvent.

The silicon-carbon negative electrode material in the present application is a conventional silicon-carbon negative electrode material (Si/C negative electrode material) in this field, and any conventional Si/C negative electrode material in this field is suitable for modification by the preparation method in the present application.

In the present application, the lithium alkoxide solution is prepared by mixing metal lithium with an alcohol solvent, and then, the silicon-carbon material reacts with the alcohol-lithium through a solvothermal reaction to generate a lithium-silicon compound, which supplements irreversible lithium loss of the silicon-carbon material in the cycle process; and meanwhile, alcohol-based functional groups will form a SEI film on the silicon-carbon surface to improve the stability of the silicon-carbon material, and realize the pre-lithiation of the surface of the silicon-carbon negative electrode material, so that when the silicon-carbon negative electrode material is used for lithium-ion batteries, the irreversible capacity of the first charge and discharge process is reduced, and the first Coulombic efficiency is improved.

Optionally, the metal lithium includes any one or a combination of at least two of lithium powder, lithium block or lithium strip; typical but non-limiting combinations include a combination of lithium powder and lithium block, a combination of lithium block and lithium strip, a combination of lithium powder and lithium strip, or a combination of lithium powder, lithium block and lithium strip.

The lithium powder, the lithium block and the lithium strip in the present application are named according to the size of the metal lithium. The selection of the metal lithium in the present application from any one of the lithium powder, the lithium block or the lithium strip or a combination of at least two indicates that any form of the metal lithium in this field can be used to prepare an lithium alkoxide solution, as long as it can be dissolved in an alcoholic solvent.

Optionally, the alcohol solvent is a fluorine-containing alcohol.

In the present application, the fluorine-containing alcohol is mixed with metal lithium, so that lithium-silicon compounds and fluorine-containing lithium salt compounds can be generated on the surface of the Si/C negative electrode material when the silicon-carbon negative electrode material and lithium alkoxide solution carry out the solvothermal reaction, and the fluorine-containing lithium salt compounds can further improve the lithium-ion conductivity of the silicon-carbon negative electrode and the electrochemical performance of the silicon-carbon material while supplementing the irreversible lithium loss of the silicon-carbon material in the cycle process.

Optionally, the fluorine-containing alcohol includes or any one or a combination of at least two of 2-fluoroethanol, 2,2-difluoroethanol, trifluoroacetaldehyde ethyl hemiacetal, 2,2,2-trifluoroethanol, 3,3,3-trifluoropropan-1-ol, 2,2,3,3,3-pentafluoro-1-propanol, hexafluoroisopropanol, hexafluorobutanol, perfluorobutanol, hexafluoro-2,3-bis(trifluoromethyl)-2,3-butanediol, 1H,1H,2H,2H-perfluorooctan-1-octanol or 1H,1H,7H-dodecafluoro-1-heptanol; typical but non-limiting combinations include the combination of 2-fluoroethanol with 2,2-difluoroethanol, the combination of trifluoroacetaldehyde ethyl hemiacetal with 2,2,2-trifluoroethanol, 3,3,3-trifluoropropan-1-ol, the combination of 3,3,3-trifluoropropan-1-ol with 2,2,3,3,3-pentafluoro-1-propanol, the combination of hexafluoroisopropanol with hexafluorobutanol, the combination of perfluorobutanol with hexafluoro-2,3-bis(trifluoromethyl)-2,3-butanediol, the combination of 1H,1H,2H,2H-perfluoro-1-octanol with 1H,1H,7H-dodecafluoro-1-heptanol, the combination of 2,2,2-trifluoroethanol with 2,2,3,3,3-pentafluoro-1-propanol or the combination of 2-fluoroethanol, 2,2-difluoroethanol, trifluoroacetaldehyde ethyl hemiacetal, 2,2,2-trifluoroethanol, 3,3,3-trifluoropropan-1-ol, 2,2,3,3,3-pentafluoro-1-propanol, hexafluoroisopropanol, hexafluorobutanol, perfluorobutanol, hexafluoro-2,3-bis(trifluoromethyl)-2,3-butanediol, 1H,1H,2H,2H-perfluoro-1-octanol with 1H,1H,7H-dodecafluoro-1-heptanol; optionally 2,2,2-trifluoroethanol and/or 2,2,3,3,3-pentafluoro-1-propanol.

Optionally, a solid-liquid ratio of the metal lithium to the alcohol solvent is (0.1-2):1, for example, 0.1:1, 0.3:1, 0.5:1, 0.8:1, 1:1, 1.2:1, 1.5:1, 1.8:1 or 2:1, but it is not limited to the listed values, and other unlisted values within this range are also applicable; and the solid-liquid ratio is in mg/mL.

Optionally, in step (1), a particle size D50 of the silicon-carbon negative electrode material is 5-30 μm, for example, 5 μm, 10 μm, 15 μm, 20 μm, 25 μm or 30 μm, but it is not limited to the listed values, and other unlisted values within this range are also applicable.

Optionally, in step (1), a solid-liquid ratio of the silicon-carbon negative electrode material to the alcohol solution is (0.01-0.5):1, for example, it can be 0.01:1, 0.05:1, 0.1:1, 0.15:1, 0.2:1, 0.25:1, 0.3:1, 0.35:1, 0.4:1, 0.45:1 or 0.5:1, but it is not limited to the listed values, and other unlisted values within this range are also applicable; and the solid-liquid ratio is in g/mL.

Optionally, in step (1), a temperature of the solvothermal reaction is 60-260° C., for example, 60° C., 70° C., 80° C., 90° C., 100° C., 110° C., 120° C., 130° C., 140° C., 150° C., 160° C., 170° C., 180° C., 190° C., 200° C., 210° C., 220° C., 230° C., 240° C., 250° C. or 260° C., but it is not limited to the listed values, and other unlisted values within this range are also applicable.

Optionally, in step (1), a time for the solvothermal reaction is 0.5-72 h, for example it can be 0.5 h, 1 h, 5 h, 10 h, 20 h, 30 h, 40 h, 50 h, 60 h, 70 h or 72 h, but it is not limited to the listed values, and other unlisted values within this range are also applicable Optionally, in step (2), an alcohol solvent used for the alcohol-washing includes anyone or a combination of at least two of 2-fluoroethanol, 2,2-difluoroethanol, trifluoroacetaldehyde ethyl hemiacetal, 2,2,2-trifluoroethanol, 3,3,3-trifluoropropan-1-ol, 2,2,3,3,3-pentafluoro-1-propanol, hexafluoroisopropanol, hexafluorobutanol, perfluorobutanol, hexafluoro-2,3-bis(trifluoromethyl)-2,3-butanediol, 1H,1H,2H,2H-perfluoro-1-octanol or 1H,1H,7H-dodecafluoro-1-heptanol; typical but non-limiting combinations include the combination of 2-fluoroethanol with 2,2-difluoroethanol, the combination of trifluoroacetaldehyde ethyl hemiacetal with 2,2,2-trifluoroethanol, 3,3,3-trifluoropropan-1-ol, the combination of 3,3,3-trifluoropropan-1-ol with 2,2,3,3,3-pentafluoro-1-propanol, the combination of hexafluoroisopropanol with hexafluorobutanol, the combination of perfluorobutanol with hexafluoro-2,3-bis(trifluoromethyl)-2,3-butanediol, the combination of 1H,1H,2H,2H-perfluoro-1-octanol with 1H,1H,7H-dodecafluoro-1-heptanol, the combination of 2,2,2-trifluoroethanol with 2,2,3,3,3-pentafluoro-1-propanol, or the combination of 2-fluoroethanol, 2,2-difluoroethanol, trifluoroacetaldehyde ethyl hemiacetal, 2,2,2-trifluoroethanol, 3,3,3-trifluoropropan-1-ol, 2,2,3,3,3-pentafluoro-1-propanol, hexafluoroisopropanol, hexafluorobutanol, perfluorobutanol, hexafluoro-2,3-bis(trifluoromethyl)-2,3-butanediol, 1H,1H,2H,2H-perfluorooctan-1-ol in combination with 1H,1H,7H-dodecafluoro-1-heptanol.

Optionally, in step (2), the drying is vacuum drying.

Optionally, a temperature of the vacuum drying is 60-100° C., for example, 60° C., 70° C., 80° C., 90° C. or 100° C., but it is not limited to the listed values, and other unlisted values within this range are also applicable.

Optionally, a time of the vacuum drying is 10-24 h, for example, 10 h, 12 h, 15 h, 16 h, 18 h, 20 h, 21 h or 24 h, but it is not limited to the listed values, and other unlisted values within this range are also applicable.

As an optional technical solution to the preparation method in the present application, which includes the following steps:

(1) mixing the silicon-carbon negative electrode material with the lithium alkoxide solution in a solid-liquid ratio of (0.01-0.5):1, and performing a solvothermal reaction at 60-260° C. for 0.5-72 h, the solid-liquid ratio is in g/mL; and a particle size D50 of the silicon-carbon negative electrode material is 5-30 μm;

(2) alcohol-washing solid powder obtained from the solvothermal reaction in step (1), and vacuum drying at 60-100° C. for 10-24 h to obtain the modified silicon-carbon negative electrode material; the lithium alkoxide solution is prepared by mixing metal lithium with alcohol solvent, a solid-liquid ratio of metal lithium to alcohol solvent is (0.1-2):1, the solid-liquid ratio is in mg/mL; and the alcohol solvent includes any one or a combination of at least two of 2-fluoroethanol, 2,2-difluoroethanol, trifluoroacetaldehyde ethyl hemiacetal, 2,2,2-trifluoroethanol, 3,3,3-trifluoropropan-1-ol, 2,2,3,3,3-pentafluoro-1-propanol, hexafluoroisopropanol, hexafluorobutanol, perfluorobutanol, hexafluoro-2,3-bis(trifluoromethyl)-2,3-butanediol, 1H,1H,2H,2H-perfluoro-1-octanol or 1H,1H,7H-dodecafluoro-1-heptanol;

in step (2), the alcohol solvent used for the alcohol-washing is the same as the alcohol solvent used for preparing the lithium alkoxide solution.

In a second aspect, the present application provides a modified silicon-carbon negative electrode material obtained by the preparation method as described in the first aspect.

In a third aspect, the present application provides an application of the modified silicon-carbon negative electrode material as described in the second aspect for preparing lithium-ion batteries.

Compared with the prior art, the present application has the following beneficial effects.

In the present application, metal lithium reacts with an alcohol solvent to generate a lithium alkoxide solution, and then the lithium alkoxide solution reacts with silicon-carbon powder for pre-lithiation. The modified silicon-carbon powder in the present application can effectively improve the initial Coulombic efficiency; in addition, the method has the advantages of simplicity, safety, low cost and the like, and is beneficial to industrial production.

BRIEF DESCRIPTION OF DRAWINGS

The Drawing is a charge-discharge curve of a modified silicon-carbon negative electrode material obtained in Example 1 and an unmodified silicon-carbon negative electrode material provided in Comparative Example 1.

DETAILED DESCRIPTION

The technical solutions of the present application are further described below by the specific embodiments. It should be clear to those skilled in the art that the examples are only to aid in the understanding of the present application and should not be considered as a specific limitation of the present application.

Example 1

This example provided a preparation method of a modified silicon-carbon negative electrode material, which includes the following steps:

(1) the silicon-carbon negative electrode material and the lithium alkoxide solution were mixed at a solid-liquid ratio of 0.2:1, and a solvothermal reaction was performed at 180° C. for 12 h, and the solid-liquid ratio was in g/mL;

(2) solid powder obtained from the solvothermal reaction in step (1) was subjected to alcohol-washing, and then vacuum dried at 60° C. for 24 h to obtain the modified silicon-carbon negative electrode material.

The lithium alkoxide solution was prepared by mixing metal lithium with alcohol solvent, a solid-liquid ratio of metal lithium to alcohol solvent was 1:1, and the solid-liquid ratio was in mg/mL; the alcohol solvent was 2,2,2-trifluoroethanol.

The alcohol solvent used for the alcohol-washing in step (2) was the same as the alcohol solvent used for preparing the lithium alkoxide solution.

A particle size D50 of the silicon-carbon negative electrode material used in this example was 5 μm, selected from HE-600 produced by IAmetal New Energy Technology Co. Ltd.

Example 2

This example provided a preparation method of a modified silicon-carbon negative electrode material, which includes the following steps:

(1) the silicon-carbon negative electrode material and the lithium alkoxide solution were mixed at a solid-liquid ratio of 0.01:1, and a solvothermal reaction was performed at 120° C. for 48 h, and the solid-liquid ratio was in g/mL;

(2) solid powder obtained from the solvothermal reaction in step (1) was subjected to alcohol washing, and then vacuum dried at 70° C. for 20 h to obtain the modified silicon-carbon negative electrode material.

The lithium alkoxide solution was prepared by mixing metal lithium with alcohol solvent, a solid-liquid ratio of metal lithium to alcohol solvent was 0.1:1, and the solid-liquid ratio was in mg/mL; the alcohol solvent was 2,2,2-trifluoroethanol.

The alcohol solvent used for the alcohol-washing in step (2) was the same as the alcohol solvent used for preparing the lithium alkoxide solution.

A particle size D50 of the silicon-carbon negative electrode material used in this example was 15 μm, selected from Si/C composites-600 mAh/g produced by Putailai.

Example 3

This example provided a preparation method of a modified silicon-carbon negative electrode material, which includes the following steps:

(1) the silicon-carbon negative electrode material and the lithium alkoxide solution were mixed at a solid-liquid ratio of 0.5:1, and a solvent-thermal reaction was performed at 260° C. for 0.5 h; and the solid-liquid ratio was in g/mL;

(2) solid powder obtained from the solvothermal reaction in step (1) was subjected to alcohol washing, and then vacuum dried at 100° C. for 10 h to obtain the modified silicon-carbon negative electrode material.

The lithium alkoxide solution was prepared by mixing metal lithium with alcohol solvent, a solid-liquid ratio of metal lithium to alcohol solvent was 2:1, and the solid-liquid ratio was in mg/mL; the alcohol solvent was 2,2,2-trifluoroethanol.

The alcohol solvent used for the alcohol-washing in step (2) was the same as the alcohol solvent used for preparing the lithium alkoxide solution.

A particle size D50 of the silicon-carbon negative electrode material used in this example was 10 μm, selected from HE-470 produced by IAmetal New Energy Technology Co. Ltd.

Example 4

This example provided a preparation method of a modified silicon-carbon negative electrode material, which includes the following steps:

(1) the silicon-carbon negative electrode material and the lithium alkoxide solution were mixed at a solid-liquid ratio of 0.2:1, and a solvent-thermal reaction was performed at 60° C. for 72 h, and the solid-liquid ratio was in g/mL;

(2) solid powder obtained from the solvothermal reaction in step (1) was subjected to alcohol washing and then vacuum dried at 80° C. for 16 h to obtain the modified silicon-carbon negative electrode material.

The lithium alkoxide solution was prepared by mixing metal lithium with alcohol solvent, a solid-liquid ratio of metal lithium to alcohol solvent was 0.5:1, and the solid-liquid ratio was in mg/mL; the alcohol solvent was 2,2,2-trifluoroethanol.

The alcohol solvent used for the alcohol-washing in step (2) was the same as the alcohol solvent used for preparing the lithium alkoxide solution.

A particle size D50 of the silicon-carbon negative electrode material used in this example was 30 μm, selected from Si/C composites-450 mAh/g produced by Putailai.

Example 5

This example provided a preparation method of a modified silicon-carbon negative electrode material, which was the same as Example 1 except that the alcohol solvent used was 2,2,3,3,3-pentafluoro-1-propanol.

Example 6

This example provided a preparation method of a modified silicon-carbon negative electrode material, which was the same as Example 1 except that the alcohol solvent used was 2-fluoroethanol.

Example 7

This example provided a preparation method of a modified silicon-carbon negative electrode material, which was the same as Example 1 except that the alcohol solvent used was 2,2-difluoroethanol.

Example 8

This example provided a preparation method of a modified silicon-carbon negative electrode material, which was the same as Example 1 except that the alcohol solvent used was hexafluoroisopropanol.

Example 9

This example provided a preparation method of a modified silicon-carbon negative electrode material, which was the same as Example 1 except that the alcohol solvent used was hexafluorobutanol.

Example 10

This example provided a preparation method of a modified silicon-carbon negative electrode material, which was the same as Example 1 except that the alcohol solvent used was 1H,1H,2H,2H-perfluoro-1-octanol.

Example 11

This example provided a preparation method of a modified silicon-carbon negative electrode material, which was the same as Example 1 except that the alcohol solvent used was methanol.

Example 12

This example provided a preparation method of a modified silicon-carbon negative electrode material, which was the same as Example 1 except that the alcohol solvent used was ethanol.

Example 13

This example provided a preparation method of modified silicon-carbon negative electrode materials, which was the same as Example 1 except that the alcohol solvent used was n-propanol.

Example 14

This example provided a preparation method of a modified silicon-carbon negative electrode material, which is the same as Example 1 except that the alcohol solvent used was n-propanol.

Example 15

This example provided a preparation method of a modified silicon-carbon negative electrode material, which was the same as Example 1 except that the alcohol solvent used was n-heptanol.

Comparative Example 1

The silicon-carbon negative electrode material provided in this comparative example was HE-600 produced by IAmetal New Energy Technology Co., with a particle size D50 of 5 μm.

Electrochemical tests were performed on the modified silicon-carbon negative electrode material obtained from Examples 1-15 and the unmodified silicon-carbon negative electrode material provided by Comparative Example 1. The test method was as follows: the obtained modified silicon-carbon anode material, acetylene black, SBR and CMC were mixed into slurry according to the mass ratio of 85:5:5:5, and the solvent was water; then the slurry was coated on a copper foil as a working electrode, and metal lithium was used as a counter electrode. The electrolyte was 1 mol/L $LiPF_6$/EC+DEC, the model of the diaphragm was Celgard 2300, which was composed of a half-cell. In the test, a current density was 50 mA/g and a voltage range was 0.05-2 V.

The charge-discharge curves of the modified silicon-carbon negative electrode material obtained in Example 1 and the unmodified silicon-carbon negative electrode material provided in Comparative Example 1 are shown in the Drawing. As can be seen from the Drawing, the first cycle Coulombic efficiency of the half-cell assembled with the modified silicon-carbon negative electrode material obtained in Example 1 is as high as 92.5%, while the first cycle Coulombic efficiency of the half-cell assembled with the original silicon-carbon negative electrode material is only 72.1%, which shows that the method in the present application can effectively improve the first cycle Coulombic efficiency of the silicon-carbon positive electrode material.

The results of the first cycle Coulombic efficiency obtained in Examples 1-15 and Comparative Example 1 are shown in Table 1.

TABLE 1

| | Reversible capacity (mAh/g) | First cycle Coulombic efficiency (%) |
|---|---|---|
| Example 1 | 602 | 92.5 |
| Example 2 | 598 | 92.1 |
| Example 3 | 467 | 92.3 |
| Example 4 | 451 | 92.2 |
| Example 5 | 599 | 92.3 |
| Example 6 | 596 | 91.7 |
| Example 7 | 591 | 91.9 |
| Example 8 | 593 | 92.1 |
| Example 9 | 601 | 92.3 |
| Example 10 | 603 | 92.4 |
| Example 11 | 532 | 82.1 |
| Example 12 | 540 | 83.3 |
| Example 13 | 543 | 83.9 |
| Example 14 | 546 | 84.2 |
| Example 15 | 552 | 84.4 |
| Comparative Example 1 | 468 | 72.1 |

In summary, in the present application, metal lithium reacts with an alcohol solvent to generate a lithium alkoxide solution, and then the lithium alkoxide solution reacts with silicon-carbon powder for pre-lithiation. The modified silicon-carbon powder in the present application can effectively improve the initial Coulombic efficiency; in addition, the method has the advantages of simplicity, safety, low cost and the like, and is beneficial to industrial production.

The applicant declares that the above description is only specific embodiments of the present application, but the scope of protection of the present application is not limited thereto.

What is claimed is:

1. A preparation method of a modified silicon-carbon negative electrode material, comprising the following steps:

(1) mixing metal lithium with an alcohol solvent to obtain a lithium alkoxide solution, mixing a silicon-carbon negative electrode material with the lithium alkoxide solution, and performing a solvothermal reaction;

wherein the alcohol solvent is a fluorine-containing alcohol;

wherein the fluorine-containing alcohol is selected from the group consisting of any one or a combination of at least two of 2-fluoroethanol, 2,2-difluoroethanol, trifluoroacetaldehyde ethyl hemiacetal, 2,2,2-trifluoroethanol, 3,3,3-trifluoropropan-1-ol, 2,2,3,3,3-pentafluoro-1-propanol, hexafluoroisopropanol, hexafluorobutanol, perfluorobutanol, hexafluoro-2,3-bis(trifluoromethyl)-2,3-butanediol, 1H,1H,2H,2H-perfluoro-1-octanol or 1H,1H,7H-dodecafluoro-1-heptanol; and (2) alcohol washing solid powder obtained from the solvothermal reaction in step (1), and drying to obtain the modified silicon-carbon negative electrode material.

2. The preparation method according to claim 1, wherein a solid-liquid ratio of the metal lithium to the alcohol solvent is (0.1-2):1, and the solid-liquid ratio is in mg/mL.

3. The preparation method according to claim 1, wherein the fluorine-containing alcohol is 2,2,2-trifluoroethanol and/or 2,2,3,3,3-pentafluoro-1-propanol.

4. The preparation method according to claim 1, wherein the metal lithium is selected from the group consisting of any one or a combination of at least two of lithium powder, lithium block or lithium strip.

5. The preparation method according to claim 1, wherein, in step (1), a particle size D50 of the silicon-carbon negative electrode material is 5-30 μm.

6. The preparation method according to claim 1, wherein, in step (1), a temperature of the solvothermal reaction is 60-260° C.

7. The preparation method according to claim 1, wherein, in step (2), the alcohol solvent used for the alcohol washing is selected from the group consisting of any one or a combination of at least two of 2-fluoroethanol, 2,2-difluoroethanol, trifluoroacetaldehyde ethyl hemiacetal, 2,2,2-trifluoroethanol, 3,3,3-trifluoropropan-1-ol, 2,2,3,3,3-pentafluoro-1-propanol, hexafluoroisopropanol, hexafluorobutanol, perfluorobutanol, hexafluoro-2,3-bis(trifluoromethyl)-2,3-butanediol, 1H,1H,2H,2H-perfluoro-1-octanol or 1H,1H,7H-dodecafluoro-1-heptanol.

8. The preparation method according to claim 1, comprising:

(1) mixing the silicon-carbon negative electrode material with the lithium alkoxide solution in a solid-liquid ratio of (0.01-0.5):1, and performing a solvothermal reaction at 60-260° C. for 0.5-72 h, and the solid-liquid ratio is in g/mL; a particle size D50 of the silicon-carbon negative electrode material is 5-30 μm;

(2) alcohol washing solid powder obtained from the solvothermal reaction in step (1), and vacuum drying at 60-100° C. for 10-24 h to obtain the modified silicon-carbon negative electrode material;

the lithium alkoxide solution is prepared by mixing metal lithium with the alcohol solvent, a solid-liquid ratio of metal lithium to alcohol solvent is (0.1-2):1, the solid-liquid ratio is in mg/mL; and the alcohol solvent comprises any one or a combination of at least two of 2-fluoroethanol, 2,2-difluoroethanol, trifluoroacetaldehyde ethyl hemiacetal, 2,2,2-trifluoroethanol, 3,3,3-trifluoropropan-1-ol, 2,2,3,3,3-pentafluoro-1-propanol, hexafluoroisopropanol, hexafluorobutanol, perfluorobutanol, hexafluoro-2,3-bis(trifluoromethyl)-2,3-butanediol, 1H,1H,2H,2H-perfluoro-1-octanol or 1H,1H,7H-dodecafluoro-1-heptanol;

the alcohol solvent used for the alcohol-washing in step (2) is the same as the alcohol solvent used for preparing the lithium alkoxide solution.

9. The preparation method according to claim 1, wherein, in step (1), a solid-liquid ratio of the silicon-carbon negative electrode material to the lithium alkoxide solution is (0.01-0.5):1, and the solid-liquid ratio is in g/mL.

10. The preparation method according to claim 1, wherein, in step (1), a time of the solvothermal reaction is 0.5-72 h.

11. The preparation method according to claim 1, wherein, in step (2), the drying in step (2) is vacuum drying;

wherein, a temperature of the vacuum drying is 60-100° C.; and wherein, a time of the vacuum drying is 10-24 h.

* * * * *